United States Patent [19]
Yoshida et al.

[11] 3,849,114
[45] Nov. 19, 1974

[54] PROCESS FOR PRODUCING HIGH CARBON FERROCHROME

[75] Inventors: Toyozi Yoshida; Kazuhisa Ushiyama; Minoru Yamanaka, all of Tokuyama, Japan

[73] Assignees: Showa Denko Kabushiki Kaisha; Shunan Denko Kabushiki Kaisha, both of Tokyo, Japan

[22] Filed: Sept. 14, 1973

[21] Appl. No.: 397,359

[52] U.S. Cl. .................................................. 75/3
[51] Int. Cl. ........................ C22b 1/14, C21b 1/08
[58] Field of Search ................................... 75/3, 5

[56] References Cited
UNITED STATES PATENTS

| | | | |
|---|---|---|---|
| 2,883,278 | 4/1959 | Douglas | 75/5 |
| 2,999,748 | 9/1961 | Basen | 75/5 X |
| 3,661,555 | 5/1972 | Kusama et al. | 75/3 |
| 3,759,695 | 9/1973 | Downing | 75/3 X |

*Primary Examiner*—A. B. Curtis
*Attorney, Agent, or Firm*—Sherman & Shalloway

[57] ABSTRACT

A process for producing high carbon ferrochrome which consists of feeding continuously to an electric furance a charge mixture consisting of sintered pellets containing substantially no free carbon, which pellets have been obtained by the partial reductive calcination of chrome ores, and a carbonaceous material of particle size 20 – 100 mm; and submitting this charge mixture to a continuous submerged arc smelting operation.

2 Claims, No Drawings

PROCESS FOR PRODUCING HIGH CARBON FERROCHROME

This invention relates to a process for producing high carbon ferrochrome and, in particular, to a process for producing commercially advantageously high carbon ferrochrome from sintered pellets obtained by the reductive calcination of chrome ores.

High carbon ferrochrome is usually produced by reducing chrome ores with carbon in an electric furnace. This method has the shortcomings that a great amount of electric power is consumed and that the productivity per electric furnace is low, since a prolonged period of smelting time is required in the electric furnace. For improving on these shortcomings, there has been proposed a method which comprises first preparing partially reduced pellets by reducing the chrome ore with carbon, using a heat source other than electricity, and thereafter smelting these pellets finally in an electric furnace to complete the reduction and obtain the intended high carbon ferrochrome. According to this method, since a part of the heat energy required for the reduction of the chrome ore is met by heat produced by a source other than electricity, i.e., heat obtained by burning of fuels, the consumption of electric power is reduced to that extent. In addition, since the chrome ore has already been partially reduced, the time required for the reduction in the electric furnace is reduced.

A method of preparing pellets by partially reducing chrome ores with a heat source other than electricity is disclosed in U.S. Pat. No. 2,883,278. For ensuring that the desired high carbon ferrochrome is formed by the further reduction of the so prepared pellets by their smelting in the electric furnace, these pellets contain a substantial amount of free carbon. That the pellets contain free carbon required for completion of their reduction appears to be exceedingly rational. However, we found that these pellets had the following drawbacks. The first drawback of these pellets containing a substantial amount of free carbon was their low mechanical strength. They tended to powder during the course of their handling, transportation and feeding to the electric furnace, as well as to powder readily in the electric furnace. The second drawback of these pellets was that the continuous operation of their smelting in the electric furnace could not be carried out smoothly without the use of an additional supply of a carbonaceous material. In fact, it was found that during the operation the pellets would melt excessively and migrate to the slag layer before their reduction had been sufficiently accomplished to lower the temperature of the slag raising the viscosity thereof, with the consequence that the continuous operation had to be stopped. While the reason therefor is not yet fully clear, it is conceivably due to the fact that since the melting speed of the pellets is greater than that of the ore, the pellets become melted and flow down into the already formed slag layer before the reaction between the free carbon contained and the oxides of iron and chromium proceeds sufficiently to result in the free carbon and the oxides becoming separately dispersed in the slag layer, with the consequence that the reaction between the two components do not proceed sufficiently.

With a view to overcoming the drawbacks of the prior art such as hereinabove described, we engaged in extensive researches. In consequence, we found that by following the method of the present invention to be fully described hereinafter it was possible to produce high carbon ferrochrome smoothly and continuously with small consumption of electric power, good efficiency and high productivity. A primary object of this invention is therefore to provide a commercially useful process for the production of high carbon ferrochrome. Other objects and advantages of the invention will become apparent from the following description.

The foregoing objects of the present invention are achieved by a process for producing high carbon ferrochrome which comprises feeding continuously to an electric-arc furnace sintered pellets obtained by the reductive calcination of chrome ore and in which of the total content of oxygen combined with the iron and chromium about 80 – 50 mol percent have been removed by reduction and the reduced iron and chromium are in the form of acid-soluble state, about 20 – 50 mol percent, without having been removed and the unreduced iron and chromium remain in the form of acid-insoluble oxides, and substantially no free carbon is contained, and a granular carbonaceous reducing material of particle sizes not greater than 100 mm, at least 70 percent by weight thereof being of sizes in the range of about 20 – 100 mm, this carbonaceous material being fed in an amount equal to 0.7 – 1.4 times the stoichiometric amount required to reduce the oxides of iron and chromium remaining in said pellets to $Fe_7C_3$ and $Cr_7C_3$, respectively, and thereafter submitting the charge in the electric-arc furnace continuously to submerged electric-arc smelting to form the high carbon ferrochrome.

The sintered pellets are those in which about 80 – 50 mol percent of the total amount oxygen combined with the two components iron and chromium in the chromium ore have been removed by reductive calcination and the reduced iron and chromium are in the form of acid-soluble state. By the expression "acid-soluble form" is meant the components are soluble in an aqueous sulfuric acid solution, practically all being in the form of the carbides of iron and chromium. On the other hand, about 20 – 50 mol percent oxygen combined with the two components, not being removed as yet, and the iron and chromium remain in the acid-insoluble state, i.e., in the form of the oxides of iron and chromium. Aside from the aforesaid iron and chromium components, the pellets also contain the oxides of magnesium, aluminum and silicon as well as other incidental impurities that are present in chrome ores. Practically all of the carbon is present as the aforementioned carbides of iron and chromium, and there is contained substantially no free carbon. By the expression "there is contained substantially no free carbon" is meant that the content of the free carbon does not exceed about 1.5 weight percent based on the weight of the pellets.

The acid-soluble and acid-insoluble iron and chromium components present in the pellets can be quantitatively determined by chemical analysis. Since the acid-insoluble oxides of iron and chromium can be expressed as $Cr_2O_3$ and $FeO$, the mol percent of oxygen in the form of these oxides remaining in the pellets can be determined as follows:

Mol percent of the oxygen $$= \frac{\left(\frac{\text{Insoluble Cr (percent)}}{52.01} \times \frac{3}{2}\right) + \left(\frac{\text{Insoluble Fe (percent)}}{55.85}\right)}{\left(\frac{\text{Total Cr (percent)}}{52.01} \times \frac{3}{2}\right) + \left(\frac{\text{Total Fe (percent)}}{55.85}\right)} \times 100$$

wherein 52.01 is the atomic weight of Cr, and 55.85 is the atomic weight of Fe.

The foregoing equation can also be said to express the rate of nonreduction of the chrome ore.

The reductive calcination of the chrome ore to such an extent that the oxygen combined with Cr and Fe contained in the pellets are less than 20 mol percent, involves technical difficulties when carried out on a commercial scale. On the other hand, pellets whose content of the aforesaid oxygen exceeds 50 mol percent are submitted subsequently to the smelting step, the consumption of electric power and the smelting time are inevitably increased, and hence the expected objects cannot be attained. Of further importance is that the pellets contain substantially no free carbon. As previously noted, pellets containing a substantial amount of free carbon tend to disintegrate. Hence, they are not only inconvenient to handle but also unsuitable for carrying out their smooth continuous smelting in an electric-arc furnace. This is also shown by the hereinafter given comparison examples.

According to the present invention, pellets containing 20 – 50 mol percent of oxygen combined with Cr and Fe, along with a carbonaceous material in an amount sufficient for removing the residual oxygen off, are continuously fed to an electric-arc furnace, where they are submitted to the submerged electric-arc reducing operation. The major portion of the carbonaceous material fed is consumed in the reduction of the oxides of Cr and Fe to the carbide form, whereas the minor portion of the carbonaceous material is consumed in reducing a part as well as a small amount of the silica that is present in the pellets and the slag former used or migrates into the slag to become lost as a result of being burned in the furnace. These various factors are taken into consideration in determining the proper amount of the carbonaceous material to be fed, suitably used being an amount equal to 0.7 – 1.4 times the stoichiometric amount required for reducing the oxides of iron and chromium contained in the pellets to the $Fe_7C_3$ and $Cr_7C_3$ forms. The stoichiometric amount is based on the following reaction equations.

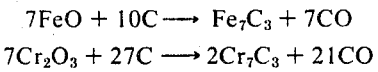

$$7FeO + 10C \longrightarrow Fe_7C_3 + 7CO$$

$$7Cr_2O_3 + 27C \longrightarrow 2Cr_7C_3 + 21CO$$

The amount of such a carbonaceous material is dependent upon the content of the oxides of Cr and Fe in the pellets, it being in the range of about 35 – 115 kg per 1,000 kg of the pellets.

In addition to maintaining the amount of the carbonaceous material within the above range, it was found that the granular size of the carbonaceous material was also a very important factor in carrying out the smooth continuous operation of the reduction step with good efficiency. The continuous submerged electric-arc smelting is carried out in the following manner. The smelting is continuously carried out while continuously feeding the aforementioned pellets, along with the carbonaceous material and, if necessary, a slag former such as lime or silica, to the top of a slag layer formed atop an underlying metal product layer formed at the furnace bottom. In the meantime, a part of the metal product formed and a part of the slag formed are continuously or, more preferably, intermittently withdrawn out of the furnace. In this case, a proper balance must be maintained between the melting speed of the fed pellets inside the furnace and the speed at which the pellets are reduced by their reaction with the carbonaceous material. That is, those pellets which are relatively meltable must not melt and flow down into the slag layer before they are reduced. This control is achieved by the carbonaceous material that is fed. Hence, a certain amount of the carbonaceous material fed must always be maintained at the top surface of the slag layer. For this purpose, the granular size of the carbonaceous material must not be too large nor too small. If the size of the carbonaceous material is too large, their reactivity with the pellets suffer, whereas if the size of the carbonaceous material is too small, the particles of the carbonaceous material migrate into the slag layer and become suspended therein, thus losing their reactivity. In addition, the size of the carbonaceous material affects the electrical resistance inside the furnace. Generally speaking, when pellets that are already partly reduced are used as in this invention, the amount of the carbonaceous material used is lesser than in the case of the conventional methods of reducing chrome ore in an electric furnace. Hence, the electrical resistance inside the electric furnace is increased to cause greater difficulty in supplying a proper amount of electricity. This increase in electrical resistance can be checked by enlarging the particle size of the carbonaceous material that is fed. However, if the size is too large, this also is undesirable, since there is a decrease in the reactivity of the carbonaceous material with the pellets. After having conducted numerous experiments in consideration of the various foregoing factors, it was found that the upper limit of the size of the carbonaceous material was about 100 mm and the optimum range of the size was about 20 – 100 mm. While the presence of a small amount of those having a size less than 20 mm can be tolerated, at least 70 percent by weight based on the total amount of the carbonaceous material used must be particles having sizes in the range of 20 – 100 mm. Preferred examples of the carbonaceous materials that can be used include coal coke, petroleum coke and anthracite.

Since a considerably large amount of the iron and chromium components which remain in the form of oxides are contained in the pellets used in this invention, the smelting must be carried out by means of the submerged arc method. And by operating thus, the smooth continuous operation becomes possible. The electric furnace used is preferably of the covered and sealed type for maintenance of a satisfactory working environment and for preventing of air pollution.

The pellets to be used in the present invention may be those prepared by any method, so long as they possess the hereinbefore-described composition. One of the preferred methods of preparation of these pellets is disclosed in U.S. Pat. No. 3,661,555, the assignee of which is the same as that of the present invention. A preferred mode of the aforesaid method and its advantage, when briefly described, are as follows. First, a mixture of a finely divided chrome ore and a finely divided carbonaceous material are pelletized. In this case, the carbonaceous material is contained in the mixture in an amount of 0.7 – 1.2 times the stoichiometric amount required for reducing the oxides of chromium and iron contained in the chrome ore to the $Cr_7C_3$ and $Fe_7C_3$ forms. The so obtained green pellets are then calcined in a rotary kiln at 1,200° – 1,500°C., thus forming sintered pellets in which about 80 – 50 mol percent of the total content of the oxygen combined with chromium and iron components is removed and said two components are in the form acid-soluble state, about 20 – 50 mol percent of oxygen is not removed and said two components remain in the form of acid-insoluble oxides, and the resulting sintered pellets contain substantially no free carbon.

In the above-described method of preparing the sintered pellets, the mixture of a finely divided chrome ore and a finely divided carbonaceous material is prepared preferably by first mixing the starting aggregate materials and then comminuting this to a powder of an average particle size of not greater than 40 microns. A part of the carbonaceous material that is mixed burns in the subsequent calcination step. Hence, the total amount of the carbonaceous material to be used must be determined in consideration of the amount of the carbonaceous material that is burned during the calcination. It has been ascertained that this total amount equals to 0.7 – 1.2 times the stoichiometric amount required for reducing the oxides of Cr and Fe contained in the chrome ore to the $Cr_7C_3$ and $Fe_7C_3$ forms. Thus, by operating as described hereinabove, sintered pellets are obtained in which about 80 – 50 mol percent of the total amount of the oxygen combined with chromium and iron components is removed, while about 20 – 50 mol percent thereof is not removed and the two components remain in the form of oxides.

The granulation of the foregoing mixture of a finely divided chrome ore and a finely divided carbonaceous material can be conveniently carried out using a suitable granulator such as a pan pelletizer, a drum type granulator or a pressured granulator after adding a small quantity of water glass or a temporary binder such as water and bentonite to the mixture. The size of resulting pellets is preferably 15 – 35 mm.

The green pellets, after drying, are submitted to calcination. Usable as the calcination furnace are the rotary kiln, shaft kiln and the like. Of these, most preferred is the rotary kiln wherein the calcination of the green pellets are carried out while tumbling the pellets therein. Heat is provided by the combustion gas of fuel oil and other conventional fuels. As a result of the combustion gas, the atmosphere inside the rotary kiln becomes partially oxidized, with the consequence that a part of the carbonaceous material burns. And in consequence of the tumbling of the pellets, a thin sintered coating of metal oxides is formed uniformly over the whole of the surface of the pellets, and there takes place a partial reduction of the oxides of Cr and Fe inside the pellet. A calcination temperature of 1,200° – 1,500°C. is suitably used. Sintered pellets prepared in this manner possess especially desirable properties. That is to say, since the whole surface of the pellets is covered with a thin sintered coating of metal oxides, the pellets are resistant to oxidation. Hence, there is practically no fear of the reduction product that is present inside the pellet becoming oxidized again even though contact is had with air. Further, the crushing strength is also great by reason of this coating. Thus, owing to the possession of these properties, these pellets can be stored without oxidation being set up. Furthermore, they do not become crushed or powdered during the course of their handling, transportation and use. In those case where the production of ferrochrome by means of smalting in an electric furnace is to be carried out in the same plant where the foregoing sintered pellets are prepared, it is possible to utilize the heat that is still retained by the pellets by feeding the pellets to the electric furnace immediately after their preparation.

The following examples are given for more fully illustrating the invention. The parts in the examples are on a weight basis.

EXAMPLE 1

The grades (weight percent) of the chrome ores and carbonaceous materials used were as follows:

| Chrome ore | | $Cr_2O_3$ | FeO | $Al_2O_3$ | MgO | $SiO_2$ |
|---|---|---|---|---|---|---|
| Chrome Ore | A | 53.3 | 13.4 | 11.9 | 9.8 | 5.1 |
| do. | B | 44.7 | 24.3 | 15.8 | 10.3 | 3.0 |
| do. | C | 49.9 | 18.3 | 12.0 | 15.1 | 3.0 |

| Carbonaceous material | | Fixed carbon | Volatiles | Ash content | Particle size (mm) |
|---|---|---|---|---|---|
| Coke | A | 86.8 | 2.1 | 10.2 | maximum 5 |
| do. | B | 86.0 | 1.7 | 11.5 | 10 – 20 |
| do. | C | 87.1 | 1.5 | 10.8 | 20 – 100 |

180 Parts of chrome ore A, 600 parts of chrome ore B, 220 parts of chrome ore C and 220 parts of coke A were mixed and thereafter comminuted to obtain a powder having a particle size in which 90 percent pass through a No. 150 Tyler mesh. This was followed by adding about 3 percent of bentonite and about 13 percent of water to this powder and pelletizing the mixture with a pan pelletizer to obtain green pellets having particle sizes of about 20 – 25 mm. The so obtained green pellets were then dried and preheated in a grate type kiln and thereafter fed to a rotary kiln where they were calcined. The maximum temperature was about 1,450°C. The resulting sintered pellets had the following analysis (weight percent).

| Total Cr | 32.64 | Acid-soluble Cr | 19.12 | Acid-insoluble Cr | 13.52 |
|---|---|---|---|---|---|
| Total Fe | 17.61 | Acid-soluble Fe | 15.81 | Acid-insoluble Fe | 1.80 |
| Total C | 3.43 | Free C | 0.08 | | |

The oxygen combined with Cr and Fe corresponds to 33.6 mol percent of the total amount of oxygen present in the starting chromium ore.

Smelting in electric furnace

One thousand parts of the hereinabove-described sintered pellets (while still in their red-heat state immediately after their preparation), 10 parts of coke B, 70 parts of coke C (equal to 1.1 times the stoichiometric amount), 60 parts of silica and 100 parts of lime stone were continuously fed to an electric furnace (18,000 KVA, three-phase, closed type), and the continuous submerged arc smelting of the pellets was carried out to obtain a high carbon ferrochrome having the following analysis (weight perent).

| Cr | C | Si | S | Fe and blance |
|---|---|---|---|---|
| 56.7 | 84.4 | 1.2 | 0.020 | 33.6 |

It was possible to operate the continuous submerged arc smelting stably, and the power consumption per ton of the product was 1,920 KWH.

Examples and Comparison Examples

The experiments were carried out as in Example 1, except that sintered pellets of various types were used, and the amounts of the carbonaceous material were varied. The results obtained are shown in the following table, along with the results of Example 1.

| Experiment No. | Grade of sintered pellets | | Amount of coke used (kg/per ton of pellets) | | | Power consumption (KWH/per ton of metal) |
|---|---|---|---|---|---|---|
| | Rate of nonconversion (%) | Free C (%) | Coke B | Coke C | Times the stoichiometric amount | |
| Example 1 | 33.6 | 0.1 | 10 | 70 | 1.1 | 1920 |
| do. 2 | 45.2 | 1.3 | 15 | 75 | 0.9 | 2180 |
| do. 3 | 27.3 | 0.4 | 0 | 60 | 1.0 | 1740 |
| Comparison 1 | 33.6 | 0.1 | 80 | 0 | 1.1 | 2190 |
| do. 2 | 31.2 | 4.0 | 0 | 0 | 0 | — |
| do. 3 | 58.5 | 1.2 | 30 | 90 | 0.9 | 2610 |

Note:-

Example 1 – 3: Instances where the requirements of the present invention have been met. Stable and smooth continuous operation was possible and the power consumption was also small.

Comparison 1: This experiment illustrates the instance where the size of the carbonaceous material was too small. Migration of the carbonaceous material to the slag layer took place before the carbonaceous material had thoroughly reacted with the pellets, thus causing difficulty in carrying out the continuous operation.

Comparison 2: In this experiment the carbonaceous material was not used, but the pellets used were those containing free carbon in an amount sufficient to reduce the amounts of the residual oxides of Cr and Fe. Disintegration and powdering of the pellets took place during the operation. Further, the pellets migrated to the slag layer before their thorough reduction had taken place. Hence, continuous operation was not possible.

Comparison 3: In this experiment the pellets used were those in which the residual amount of the oxides of Cr and Fe was too great. While it was possible to carry out the continuous operation, the power consumption was too great. Hence, this would be a disadvantage in operating on a commercial scale.

We claim:

1. A process for producing high carbon ferrochrome which comprises feeding continuously to an electric-arc furnace a charge mixture consisting of sintered pellets obtained by the reductive calcination of chrome ores, said pellets being those in which about 80 – 50 mol percent of the total content of the oxygen combined with iron and chromium components has been removed and the two components are in the acid-soluble from and about 20 – 50 mol percent, without having been removed and the two components remain in the form of acid-insoluble oxides, and containing substantially no free carbon, and a granular carbonaceous reducing material of particle sizes not greater than 100 mm, at least 70 percent by weight thereof being of sizes in the range of about 20 – 100 mm, said carbonaceous material being fed in an amount equal to 0.7 – 1.4 times the stoichiometric amount required to reduce the oxides of iron and chromium remaining in said pellets to $Fe_7C_3$ and $Cr_7C_3$, respectively; and thereafter submitting said charge mixture in said electric-arc furnace continuously to a submerged electric-arc smelting operation to form the high carbon ferrochrome.

2. The process of claim 1 wherein said sintered pellets are obtained by pelletizing a mixture of a finely divided chrome ore and a finely divided carbonaceous material, the content of the latter in said mixture equalling an amount 0.7 – 1.2 times the stoichiometric amount required for reducing the oxides of chromium and iron to the $Cr_7C_3$ and $Fe_7C_3$ forms, and thereafter calcining the resulting green pellets at 1,200° – 1,500°C. in a rotary kiln.

* * * * *